United States Patent
Witteveen

(10) Patent No.: US 11,547,137 B2
(45) Date of Patent: Jan. 10, 2023

(54) TOPICAL FLAVOURING COMPOSITIONS COMPRISING OLEIC ACID AND SODIUM OLEATE

(71) Applicant: Givaudan, S.A., Vernier (CH)

(72) Inventor: Frans Witteveen, CM Leusden (NL)

(73) Assignee: Givaudan SA, Vernier (CH)

( * ) Notice: Subject to any disclaimer, the term of this patent is extended or adjusted under 35 U.S.C. 154(b) by 126 days.

(21) Appl. No.: 16/693,877

(22) Filed: Nov. 25, 2019

(65) Prior Publication Data

US 2020/0085091 A1 Mar. 19, 2020

Related U.S. Application Data

(63) Continuation of application No. 15/554,149, filed as application No. PCT/EP2016/055115 on Mar. 10, 2016, now Pat. No. 10,555,550.

(30) Foreign Application Priority Data

Mar. 10, 2015 (GB) ...................................... 1504045

(51) Int. Cl.
*A23P 20/10* (2016.01)
*A23L 27/00* (2016.01)
*A23L 27/26* (2016.01)

(52) U.S. Cl.
CPC ................ *A23P 20/11* (2016.08); *A23L 27/26* (2016.08); *A23L 27/70* (2016.08); *A23V 2002/00* (2013.01); *A23V 2250/188* (2013.01)

(58) Field of Classification Search
CPC .......... A23L 27/70; A23L 27/26; A23P 20/11; A23V 2002/00; A23V 2250/188
See application file for complete search history.

(56) References Cited

U.S. PATENT DOCUMENTS

| | | | |
|---|---|---|---|
| 2,162,904 A | 6/1939 | Allison | |
| 3,507,665 A | 4/1970 | Henthorn | |
| 3,954,658 A * | 5/1976 | Tsutsumi | A61K 8/06 516/74 |
| 4,526,816 A * | 7/1985 | Misczyk | C03C 17/28 106/243 |
| 5,037,564 A | 8/1991 | Nishizaki et al. | |
| 5,695,802 A | 12/1997 | Van Den Ouweland et al. | |

FOREIGN PATENT DOCUMENTS

| | | |
|---|---|---|
| EP | 0 295 509 A1 | 12/1988 |
| GB | 2278554 A | 12/1994 |
| KR | 10-2011-0070109 A | 6/2011 |

OTHER PUBLICATIONS

The Wayback Machine—https://web.archive.org/web/20130316175757/http://www.thegoodscentscompany.com/data/ab1029091.html (Year: 2013).*
Standard methods for Apis Mellifera beeswax Research. Journal of Apicultural Research, 2019, vol. 58, No. 2, pp. 1-108. (Year: 2019).*
PCT/EP2016/055115—International Search Report, dated Jun. 21, 2016.
PCT/EP2016/055115—International Written Opinion, dated Jun. 21, 2016.
Office Action in U.S. Appl. No. 15/554,149, dated Apr. 4, 2019.

* cited by examiner

*Primary Examiner* — Subbalakshmi Prakash
(74) *Attorney, Agent, or Firm* — Curatolo, Sidoti & Trillis Co., LPA; Salvatore A. Sidoti; Brittany L. Kulwicki

(57) ABSTRACT

A topical flavouring product of a solid flavouring dispersed in a non-aqueous continuous medium containing oleic acid and sodium oleate in the relative weight proportions of from 80:20-54:46. A method of applying to the surface of a comestible product a solid flavouring, comprising dispersion of the solid flavouring in a non-aqueous continuous medium in the presence of oleic acid and sodium oleate and its topical application to the product, the oleic acid and sodium oleate being present in the relative weight proportions of from 80:20-54:46.

7 Claims, No Drawings

TOPICAL FLAVOURING COMPOSITIONS COMPRISING OLEIC ACID AND SODIUM OLEATE

This application is a continuation of U.S. Ser. No. 15/554,149, filed Aug. 28, 2017, which is a national stage application of PCT International Application No. PCT/EP2016/055115, filed Mar. 10, 2016, which claims priority from United Kingdom Patent Application Serial No. 1504045.4, filed Mar. 10, 2015, all of which are hereby incorporated by reference in their entireties.

This disclosure relates to the provision of flavours in oils.

Many flavours are applied topically to comestible products, such as foodstuffs, baked goods, etc. While many are applied as solutions, there are many that have to be applied as solids. These solid flavourings can be inherently solid, such as salt, or they can be powdered flavourings, such as spray-dried powders (flavour compounds encapsulated in an edible polymeric medium, such as starch). It is often desirable that these be suspended in non-aqueous media, such as edible oils, which are then applied to the comestible products by coating or spraying, prior to further treatment, such as baking. When a dispersion is freshly prepared, there is no problem. However, preparation of large quantities for use on a production line brings the problem that the solids may settle and the dispersion separate into two distinct layers, making application to the products impossible.

It has now been found that it is possible to keep such solid flavourings in suspension for long periods, such that there is no wastage of product and production can be kept running for long periods without the necessity to stop for maintenance. There is therefore provided a method of applying to the surface of a comestible product a solid flavouring, comprising dispersion of the solid flavouring in a non-aqueous continuous medium in the presence of oleic acid and sodium oleate and its topical application to the product, the oleic acid and sodium oleate being present in the relative weight proportions of from 80:20-54:46.

There is additionally provided a topical flavouring product comprising a solid flavouring dispersed in a non-aqueous continuous medium, which also contains of oleic acid and sodium oleate in the relative weight proportions of from 80:20-54:46.

The solid flavouring may be any solid flavouring whose presence is desired on the surface of a comestible product. Typical examples include, but are not limited to, salt, spray-dried flavours sugar, artificial sweeteners (powders), maltodextrines, vegetable-, fruit pulp, citric acid, malic acid, lactic acid, monosodium glutamate and taste enhancers. More than one such solid flavouring may be used.

The non-aqueous continuous medium may be any such edible medium suitable for application to a comestible product by any convenient means, for example, spraying, coating or dipping. A typical example is an edible oil, non-limiting examples of such oils including sunflower oil, palm oil, olive oil, rapeseed oil, canola oil, sesame seed oil, walnut oil, hazelnut oil, peanut oil, corn oil, coconut oil, butter oil, rice bran oil, soybean oil, grape seed oil, fish oil, pine nut oil, cashew oil, macadamia oil, mongongo oil, almond oil, beech oil, pecan oil, pistachio oil, cotton seed oil, safflower oil, pumpkin seed oil, egusi seed oil, buffalo gourd oil, bitter gourd oil, bottle gourd oil, butternut squash oil, acai oil, black seed oil, blackcurrant seed oil, borage seed oil, evening prime rose oil, flaxseed oil, amaranth oil, apricot oil, apple seed oil, argan oil, avocado oil, babassu oil, ben oil, borneo tallow nut oil, cape chestnut oil, carob pod oil, cocoa oil, cocklebur oil, cohune oil, coriander seed oil, date seed oil, dika oil, false flax oil, hemp oil, kapok seed oil, kenef seed oil, lallemantia seed oil, mafura oil, meadowfoam seed oil, marula oil, mustard seed oil, niger seed oil, nutmeg butter, okra seed oil, papaya seed oil, parilla seed oil, persimmon seed oil, pequi oil, pilli nut oil, pomegrate seed oil, poppy seed oil, prune kernel seed oil, quinoa seed oil, ramtil oil, rice bran oil, royle oil, sascha inchi oil, sapote oil, seje oil, shea butter, taramira oil, tea seed oil, thistle oil, tigernut oil, tobacco seed oil, tomato seed oil, wheat germ oil, medium chain glycerides (MCT), saturated fatty acids, unsaturated fatty acids (mix of both) and all edible animal fatty acids.

Oleic acid and sodium oleate are well-known items of commerce. The weight proportion of oleic aid to sodium oleate may be from 80:20-54:46. Particular embodiments are 70:30-56:44, more particularly 62:38-58:42.

The overall proportion of oleic acid and sodium oleate in a flavouring product as hereinabove described will naturally vary depending on use and application method, but it will typically be in the range of 01% to 20% by weight of the total weight of continuous medium, oleic acid/sodium oleate and solid flavouring, although particular effects may be achievable by working outside this range. The proportions of solid flavouring and continuous medium may also be varied within wide limits. Typical non-limiting examples are from 05% to 50% by weight of solid flavouring and from 50% to 95% by weight of continuous medium. This is the range relevant to a flavouring product ready for use. It is also possible to prepare the flavouring product as a concentrate, which can be diluted ready for any use by adding sufficient continuous medium. A typical concentrate will comprise from 20 to 60% by weight of continuous medium, with correspondingly higher proportions of solid flavouring and oleic acid/sodium oleate, their relative proportions being those desired in the final product.

The dispersion of solid flavouring in the continuous medium may be performed by any convenient method, typically stirring in ambient temperatures.

The resulting flavour dispersion may be applied to the comestible product by any convenient means, such as spraying, coating and dipping.

The comestible product to which the flavour dispersion may be applied may be any comestible product on which a topical flavouring is required. Non-limiting examples include baked goods such as biscuits, cookies, cakes and bread, snack foods such as chips and crisps, pretzels and crackers.

The method and product of the disclosure has the advantage that the flavouring mixture remains stable for some hours after mixing, and the result is a very uniform coating. This has the added advantage that any spray nozzles are not blocked by settling solid material.

The disclosure is further described with reference to the following non-limiting examples, which describe particular embodiments. All parts are by weight.

EXAMPLE 1

Determination of Appropriate Proportions of Oleic Acid and Sodium Oleate.

Various proportions of oleic acid and sodium oleate were combined in sunflower oil to determine which ratios were appropriate. What was desirable was a clear, homogeneous solution of the oleic acid/sodium oleate mixture in the oil. All mixtures of sodium oleate and oleic acid were added to the oil at 4.8% by weight and agitated on a Brookfield viscometer, spindles No. 62 and 63 @30 rpm.

| Mix | Oleic Acid | Na Oleate | Clear solution | |
|-----|------------|-----------|----------------|---|
| A | 90 | 10 | Negative | 19 mPas by 20° C. |
| B | 80 | 20 | Positive | 75 mPas by 20° C. |
| C | 70 | 30 | Positive | 103 mPas by 20° C. |
| P | 64 | 36 | Positive | 139 mPas by 20° C. |
| N | 62 | 38 | Positive | 175 mPas by 20° C. |
| D | 60 | 40 | Positive | 234 mPas by 20° C. |
| J | 58 | 42 | Positive | 218 mPas by 20° C. |
| K | 56 | 44 | Positive | 183 mPas by 20° C. |
| L | 54 | 46 | Positive | 189 mPas by 20° C. |
| M | 52 | 48 | Negative | 20 mPas by 20° C. (lumps) |
| E | 50 | 50 | Negative | Not possible |

Homogeneous blends were readily possible between 80:20 and 54:46 oleic acid:sodium oleate, with increasing, but workable viscosities. However, at 52:48, lumps were formed, and this became worse at 50:50 and lower.

The best result (clear solution plus higher, but workable, viscosity was found at 60:40.

EXAMPLE 2

Use on Crackers.

A flavoured coating was prepared by blending 15 parts sunflower oil, 4 parts chorizo flavouring powder and 1 part of a 60:40 oleic acid:sodium oleate mixture.

The flavouring was applied to 80 parts crackers by rotating disc spray. Examination revealed that the distribution of flavouring was very uniform, even if the flavouring composition had been allowed to stand for some hours.

In contrast, a flavouring composition, identical except for the absence of the oleic acid:sodium oleate mixture, started to separate into layers within a minute of preparation and spraying produced a very uneven flavouring distribution. Eventually the composition was completely unsprayable.

EXAMPLE 3

Preparation of Flavour Concentrate

A concentrate was prepared by blending the following components:
40 parts chorizo seasoning powder
54.7 parts sunflower oil
5.3 parts 60:40 oleic acid/Na oleate mix Such a concentrate may be suitably diluted with further oil to provide any desirable composition for any given application.

The invention claimed is:

1. A topical flavouring product comprising a solid flavouring dispersed in a non-aqueous continuous medium;
    wherein said solid flavouring is selected from the group consisting of salt, spray-dried flavours, sugar, artificial sweeteners, maltodextrins, vegetable pulp, fruit pulp, citric acid, malic acid, lactic acid, and monosodium glutamate; and
    wherein said medium contains oleic acid and sodium oleate in the relative weight proportions of from 80:20-54:46.

2. The product according to claim 1, in which the weight ratio of oleic acid to sodium oleate is from 70:30-56:44.

3. The product according to claim 1, in which the weight ratio of oleic acid to sodium oleate is from 62:38-58:42.

4. The product according to claim 1, in which the weight ratio of oleic acid to sodium oleate is 60:40.

5. The product according to claim 1, in which the overall proportion of oleic acid and sodium oleate in the product is in the range of 1% to 20% by weight of the total weight of continuous medium, oleic acid/sodium oleate and solid flavouring.

6. The product according to claim 1, in which the proportions of solid flavouring and continuous medium are from 5% to 50% by weight of solid flavouring and from 50% to 95% by weight of continuous medium.

7. A flavour concentrate comprising (a) from 20% to 60% by weight of continuous medium, (b) a solid flavouring, (c) oleic acid, and (d) sodium oleate, wherein the flavour concentrate is dilutable with further continuous medium to provide a flavoring product having 1% to 20% by weight of oleic acid and sodium oleate of the total weight of (a) the continuous medium, (b) the solid flavouring, (c) the oleic acid, and (d) the sodium oleate, wherein the (c) oleic acid and (d) sodium oleate are in relative weight proportions of from 80:20-54:46, and wherein the proportions of (b) the solid flavouring and (a) the continuous medium are from 5% to 50% by weight of (b) the solid flavouring and from 50% to 95% by weight of (a) the continuous medium.

* * * * *